US011552704B1

(12) United States Patent
Christensen et al.

(10) Patent No.: US 11,552,704 B1
(45) Date of Patent: Jan. 10, 2023

(54) TRANSPORT DATA STRUCTURE USEFUL FOR TRANSPORTING INFORMATION VIA A FREE SPACE OPTICAL LINK USING A PULSED LASER

(71) Applicant: L3Harris Technologies, Inc., Melbourne, FL (US)

(72) Inventors: Carl Christensen, South Jordan, UT (US); Ryan W. Hinton, Erda, UT (US); Scott C. Smedley, West Jordan, UT (US); David G. Landon, Bountiful, UT (US); Richard Ross, Sandy, UT (US); Michael Solonenko, San Diego, CA (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/397,453

(22) Filed: Aug. 9, 2021

(51) Int. Cl.
*H04B 10/11* (2013.01)
*H04L 7/00* (2006.01)

(52) U.S. Cl.
CPC ............ *H04B 10/11* (2013.01); *H04L 7/0075* (2013.01)

(58) Field of Classification Search
CPC .............................. H04B 10/11; H04L 7/0075
USPC .......................................................... 398/118
See application file for complete search history.

(56) References Cited

U.S. PATENT DOCUMENTS 9,641,312 B1 * 5/2017 Fischer ................. H04L 7/0016
10,148,474 B2 * 12/2018 Kaizu .................. H04B 1/0007
2002/0150118 A1 * 10/2002 Zinke .................. H04L 25/4902 370/252
2003/0072050 A1 * 4/2003 Vrazel ................. H04B 10/541 398/9
2006/0062329 A1 * 3/2006 Chua ....................... H04L 7/041 375/316
2016/0323035 A1 * 11/2016 Jovicic ................. H04B 10/116
2020/0358591 A1 * 11/2020 Ayling ................. H04B 10/112

* cited by examiner

*Primary Examiner* — Dalzid E Singh
(74) *Attorney, Agent, or Firm* — Workman Nydegger

(57) ABSTRACT

Synchronizing a pulse position modulation (PPM) signal. A method includes performing a first synchronization operation by receiving a first series of symbols. The symbols in the first series are transmitted with a pulse in a known slot, such that the symbols comprise pulses that are substantially equally spaced in time from adjacent symbols. The first synchronization operation includes identifying when each pulse is received for each of the symbols and using information identifying when each pulse is received for each of the symbols in the first series of symbols to identify symbol and slot boundaries for the pulse position modulation signal. The method further includes performing a second synchronization operation by receiving a second series of symbols transmitted in a known pattern, and identifying the known pattern in the received second series of symbols to identify a frame boundary.

20 Claims, 5 Drawing Sheets

500

502 Perform a first synchronization operation

504 Receive a first series of symbols

506 Identify when each pulse is received for each of the symbols in the first series of symbols 508 Using information identifying when each pulse is received for each of the symbols in the first series of symbols to identify symbol and slot boundaries for the pulse position modulation signal 510 Perform a second synchronization operation 512 Receive a second series of symbols transmitted in a known pattern 504 Identify the known pattern in the received second series of symbols to identify a frame boundary

TRANSPORT DATA STRUCTURE USEFUL FOR TRANSPORTING INFORMATION VIA A FREE SPACE OPTICAL LINK USING A PULSED LASER

BACKGROUND

Background and Relevant Art

Some communication systems transmit data across a free space optical link using pulse position modulation (PPM). PPM is used since it allows for multiple bits to be represented by a single pulse. In PPM, symbols are transmitted where each symbol is defined using a plurality of time slots. A pulse in one of the time slots defines the symbol value. Thus, for example, in a PPM scheme with four time slots, a pulse may be emitted at a time to correspond to one of the time slots to select between four different possible symbol values. Inter-symbol guard times (discussed in more detail below) are used between symbols to ensure that a minimum time elapses between adjacent symbol pulses in adjacent symbols. This may be, for example, for charge time of a laser needed between laser pulses. A symbol period, therefore includes a symbol time and a guard time. The symbol time includes a plurality of slot times, depending on the number of slots. Stated differently, the symbol period is the sum of the symbol time and guard time. The symbol time is the sum of the slot times.

Thus, a PPM symbol comprises $2^n$ (wherein n is the number of bits being represented) time slots followed and/or preceded by a guard time. For example, using ordinary binary coding, ten bits are encoded into 1024 slots as follows: if all ten bits are zero, the pulse will be in the first slot, if all are zero but the least significant bit is a one, then the second slot will have a pulse, and so on until if all bits are ones, then the pulse will be in the 1024th slot. If each slot time in this example is 1 ns, then the symbol time is 1024 ns.

The guard time is used to ensure that the minimum time between pulses required for a particular laser or other transmitter (typically due to physical constraints of the transmitter) is met. For example, Q-pulsed lasers require time to charge after each pulse. Issues can arise when the first symbol is near the end, say 1023, and the next pulse is early, say a zero. Thus, the guard time is designed based on this worst-case scenario. In particular, for waveforms designed to be used with Q-pulsed lasers, this type of laser can deliver very powerful short pulses, but they require a considerably large time (as compared to slot times) between pulses. Thus, in the running example, the guard time may be selected to be 2.976 μs, such that a new symbol is transmitted on average every 4 μs (i.e., the symbol period). Thus, in this example, only about 25% of the symbol period will ever include useful data that needs to be extracted.

With many communication systems, there is a need to time synchronize the data to be able to extract the data. This is particularly true, for example, when data is encoded using forward error correction (FEC) coding as data frames need to be identified so that FEC decoding can be applied on a data frame basis. Thus, there is a need in some PPM systems to identify frames, where each frame is made up of multiple symbols, and thus multiple pulses, and thus occurs over multiple symbol periods. Thus, to decode the symbols, symbol boundaries are identified. That is, for a given symbol period, the symbol time needs to be identified. Further, there is a need to identify slot boundaries within the symbol boundaries.

When PPM systems are used it can be time consuming to identify slot boundaries, symbol boundaries, and frame boundaries for data. With respect to slot and symbol boundaries, the symbol is represented by a relatively few slot times when compared with the total symbol period. For example, in the example above, a pulse will occur in less than 1% of the period. Even in typical systems, approximately 80% of the symbol period is guard time, meaning only 20% of the symbol period has the possibility of including useful data. Nonetheless, to achieve symbol synchronization, the entire space must be searched.

Note also that while the above example includes 1024 slot times, a typical implementation might include symbols with many more slot times. Indeed, some embodiments may have up to 8,192 slots per symbol. Previous systems would attempt to find symbol and slot boundaries by monitoring the output of the PPM system over a 'long' period of time, over multiple symbol periods, to see where in a data stream energy was emitted in each of the multiple symbol periods. Where light energy appeared (over multiple pulses, over a 'long' period of time) represents the location of the symbol and slot times, from which symbol and slot boundaries can be derived. As can be imagined, in a system having on the order of 1,000 slot times, and depending on the statistical distribution of slot values, several thousand symbol periods may need to occur before all symbol boundaries and slot boundaries can be identified, even when the signal has a high signal to noise ratio (SNR). Even more symbol periods may need to occur for lower SNRs.

Further, with respect to SNR, when strong Low-Density Parity Check (LDPC) codes are used for error correction, the demodulator is required to work at a very low SNR. For example, the rate-1/2 code with 16-PPM achieves a bit error rate of less than $1 \cdot 10^{-5}$ by 3 dB $E_s/N_0$ (energy per symbol over the noise spectral density). At this SNR, over 40% of the symbols will be decided incorrectly by an uncoded demodulator.

Thus, current symbol synchronization systems require searching over a large state space and hardware includes large RAM resources for storing detected pulses.

Thus, there is a need in PPM systems, and other systems having times in a symbol period for data transmission and times in the symbol period that are latent, to more quickly identify symbol and slot boundaries.

The subject matter claimed herein is not limited to embodiments that solve any disadvantages or that operate only in environments such as those described above. Rather, this background is only to illustrate one exemplary technology area where some embodiments described herein may be practiced.

BRIEF SUMMARY

One embodiment illustrated herein includes a method that may be practiced to synchronize a pulse position modulation (PPM) signal comprising a plurality of PPM symbols. Each symbol has a plurality of time slots. A pulse in one of the time slots defines the symbol value. Each symbol is associated with a guard time used to ensure a minimum time between adjacent symbol pulses in adjacent symbols. The method includes performing a first synchronization operation by receiving a first series of symbols. Each of the symbols in the first series of symbols is transmitted with a pulse in a known slot, such that the first series of symbols comprises pulses that are substantially equally spaced in time from adjacent symbols. The first synchronization operation further includes identifying when each pulse is received for each of the symbols in the first series of symbols. The first synchronization operation further includes using information identifying when each pulse is received for each of the symbols in the first series of symbols to identify symbol and slot boundaries for the pulse position modulation signal. The method further includes performing a second synchronization operation by receiving a second series of symbols transmitted in a known pattern, and identifying the known pattern in the received second series of symbols to identify a frame boundary.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to synchronizing a pulse position modulation (PPM) signal. In particular, embodiments perform a two-stage synchronization where the first synchronization stage is used to identify slot boundaries and symbol boundaries. Additionally, the first synchronization stage can identify guard time in a symbol period. The second synchronization stage acts to identify a frame boundary. Once the slot boundaries, symbol boundaries, and frame boundaries have been identified then appropriate digital signal processing, such as FEC decoding, or other operations can be performed. A detailed example is now illustrated.

Figure 1:
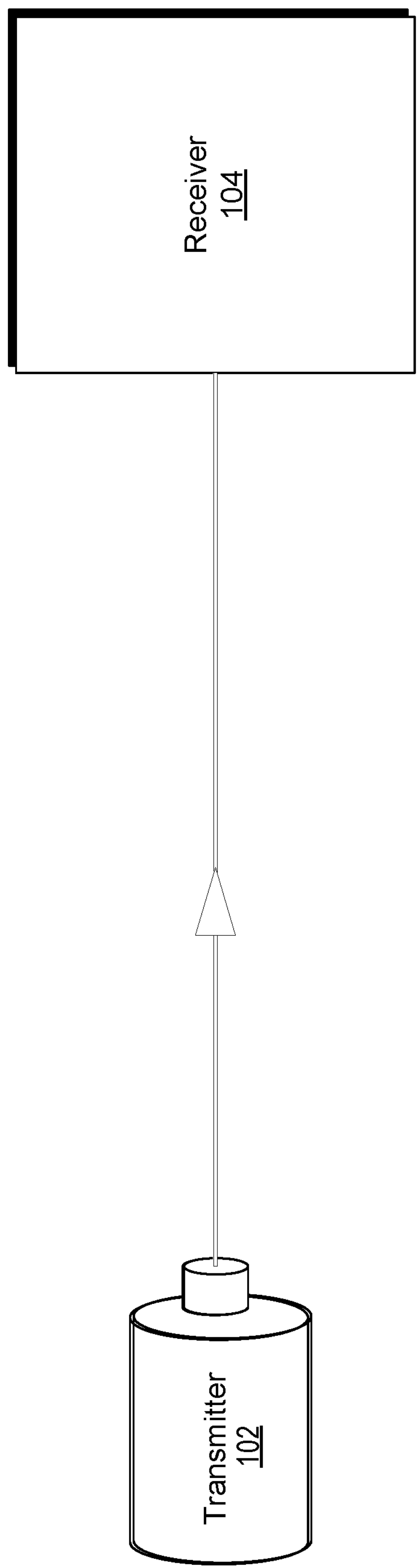
FIG. 1 illustrates a transmitter and receiver pulse position modulation.

Attention is directed to FIG. 1 which illustrates a transmitter 102 and a receiver 104. In the example illustrated in FIG. 1, the transmitter 102 includes a Q-pulsed laser. In particular, data is used to modulate a laser such that a PPM signal is produced as described previously. Note that in some embodiments, the transmitter 102 is configurable such that various PPM schemes can be implemented. In particular, various modes can be selected where the modes define pulse width, LDPC types, data rates, LDPC block size, bits per pulse, PPM mode, number of guard slots, guard time, active slot time, PPM symbol time, etc. Note that for a Q-pulsed laser, typical pulse widths range from 0.4 to 204 ns and data rates range from 150 to 400 kb/s.

Figure 4:
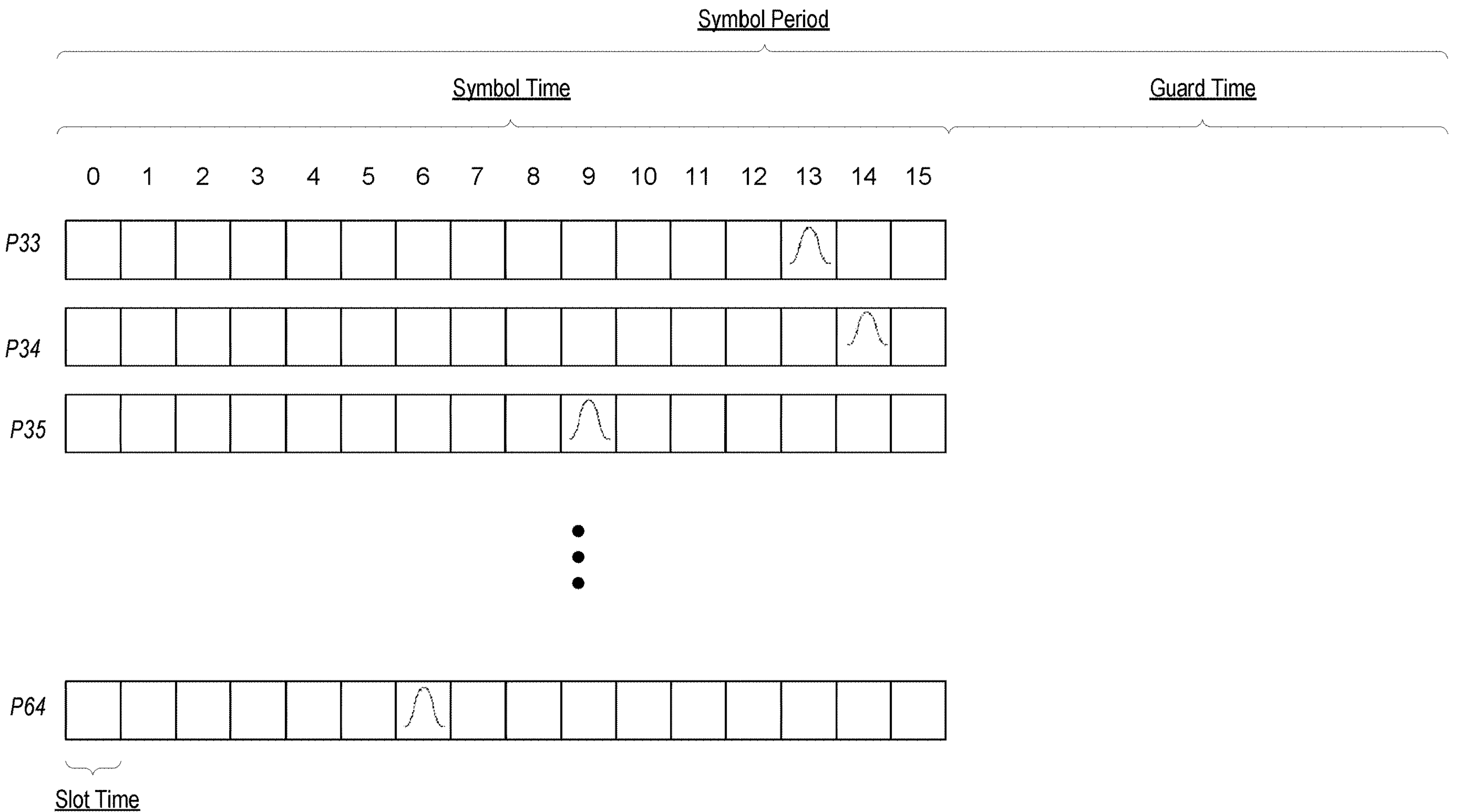
FIG. 4 illustrates a second series of symbols received by a receiver.

For clarity, the user's attention is directed to FIG. 4 which illustrates the pulses that the receiver 104 receives during the second synchronization stage that will be explained in more detail below, but serves as an effective illustration to how pulses can be transmitted by the transmitter 102, as well. A series of pulses P33 through P64 are sequentially transmitted by the transmitter 102 over 32 symbol periods with one pulse per symbol period, with subsequent symbol periods occurring immediately after a preceding symbol period. The pulses are received by the receiver 104 as illustrated by the pulses in FIG. 4. The transmitter 102 transmits different symbol values by causing pulses to occur in different slot times. For example, FIG. 4 illustrates that in a pulse P33, the pulse occurs in the slot time corresponding to the symbol value 13 in a particular symbol time and symbol period. Thus, the symbol value for pulse P33 is 13. Similarly, the symbol value for pulse P34 is 14. Similarly, the symbol value for pulse P35 is 9. Similarly, the symbol value for pulse P64 is 6.

Note that while the embodiments illustrated above have shown using standard binary coding of the PPM symbols into the time slots, it should be appreciated that in other embodiments, other types of encoding may be used. For example, in some embodiments, gray coding may be used. In particular, the use of gray coding will help minimize performance degradation when channel spreading exceeds a given slot.

Note further, that as will be discussed later herein, FIG. 4 illustrates an example of receiving data, however, FIG. 4 is instructive for illustrating how the transmitter 102 can time output pulses to encode symbol values into the pulses. In particular, the transmitter 102 functions using a known symbol period where the symbol period is comprised of a symbol time and a guard time. The symbol time is subdivided into a predetermined number of slot times. For each pulse in which the transmitter 102 transmits a symbol value, the transmitter 102 will time emission of a pulse to correspond to the appropriate slot time to indicate the appropriate symbol value.

FIG. 1 further illustrates a receiver 104. The receiver 104 includes hardware that can convert signals received from the transmitter 102 into electrical pulses for processing. For example, if the transmitter 102 is a laser, the receiver 104 may include photodiodes that are able to sense light energy transmitted from the transmitter 102. Note that embodiments are not necessarily limited to laser applications, but rather other types of transmissions may be used in other embodiments. In particular, embodiments generally apply to PPM modulation where a slot time is used to indicate a symbol value and where a guard time exists between symbol times. Other systems may implement similar PPM schemes having these characteristics. For example, certain radar systems use radio waves to perform object detection functionality but can also use the hardware to modulate the radio waves to accomplish communications. Thus, in this example, when the radio waves are being used to accomplish radar functionality, this can be seen as a guard time in a PPM scheme whereas when the radio waves are being used to perform communication functionality, this can be seen as a symbol time, if a PPM communication scheme is used.

Returning once again to the details of the receiver 104, as noted previously, the receiver 104 will convert signals received from the transmitter 102 to electrical pulses that can be processed by signal processing hardware and/or software at the receiver 104.

As noted previously, often the data transmitted from the transmitter 102 to the receiver 104 is encoded in a format that may require identifying frame boundaries so that the data can be appropriately processed. However, to identify the frame boundaries, embodiments must first identify slot boundaries and symbol boundaries, as well as identifying the guard time in the symbol period. As noted previously, this is accomplished by using a two-stage synchronization process.

Figure 2A:
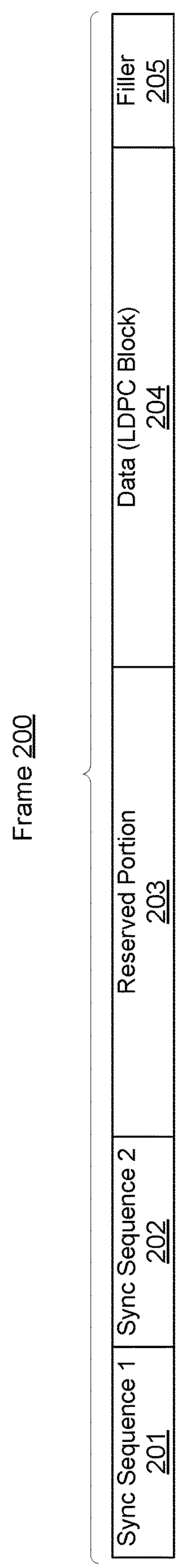
FIG. 2A illustrates a pulse position modulation frame.
Figure 2B:
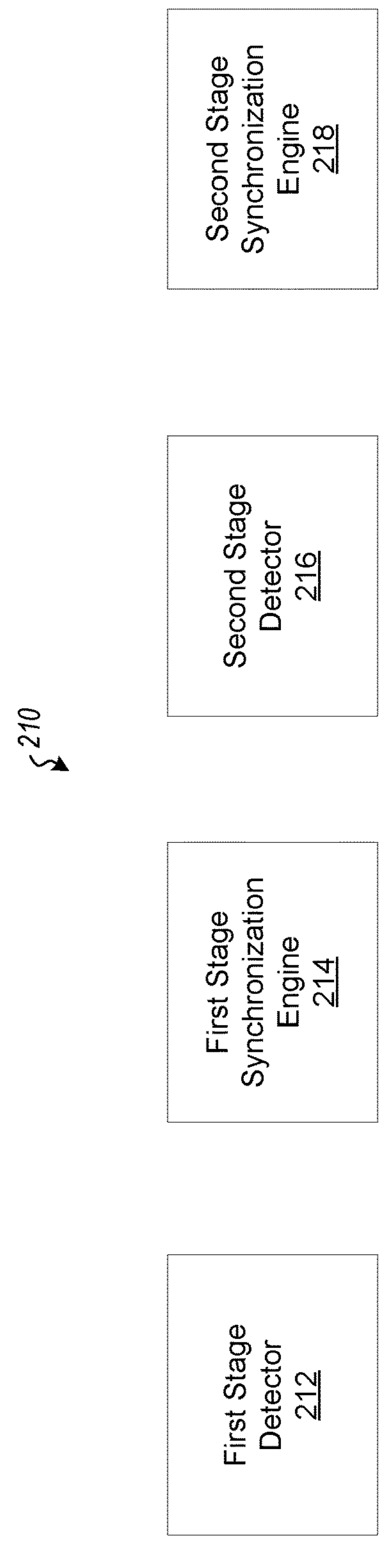
FIG. 2B illustrates a system for synchronizing a pulse position modulation signal.

Attention is now directed to FIG. 2A which illustrates additional details. FIG. 2A illustrates a frame 200, while FIG. 2B illustrates a synchronization system 210 which is configured to synchronize data in the frame 200 at the receiver 104.

The frame 200 is comprised of multiple PPM pulses. For example, FIG. 2A illustrates that the frame 200 includes a first synchronization sequence 201 that is composed of 32 PPM pulses. The frame 200 includes a second synchronization sequence 202 that is composed of 32 pulses. These two synchronization sequences are used, as described below, to identify slot boundaries, symbol boundaries, and frame boundaries.

The frame 200 includes a reserved portion 203 that in this example is composed of 192 pulses. The reserved portion 203 could be used, for example, to transfer information outside of the payload. For example, the reserved portion 203 could be used to transfer pulse width estimation between nodes of a bi-directional link. The use of 192 symbols allows for 768 bits of information. In an alternative or additional embodiment, the reserved portion 203 can use the bits for node to node information passing as part of initial link establishment. In any case, sufficient bits are provided to allow a simple block FEC on the information.

The frame 200 includes a data block 204 which includes, in this example, 4,782 pulses. In this example, payload data comprises user data that has been encoded for LDPC FEC.

The frame 200 further includes a filler block 205 that also includes a variable number of pulses to cause the frame 200 to be some consistent size. For example, the payload data block 204 plus the filler block includes bits necessary to make the payload fit into the n-bit PPM symbols.

Note that the number of pulses specified for this example, are only for this particular example, and other numbers of pulses may be used. These numbers represent one particular mode of PPM and other modes may use other numbers of pulses.

The synchronization system 210 includes a first stage detector 212 comprising a filter hardware and potentially software, such as a matched filter, to identify pulses in the first synchronization sequence 201. A first stage synchronization engine 214 includes hardware and potentially software to synchronize pulses to identify slot boundaries, symbol boundaries, and a guard time. A second stage detector 216 includes filter hardware and potentially software, such as a matched filter, to identify pulses in the second synchronization sequence 202. A second stage synchronization engine 218 includes hardware and potentially software to synchronize pulses versus a known pulse pattern to identify frame boundaries.

Figure 3:
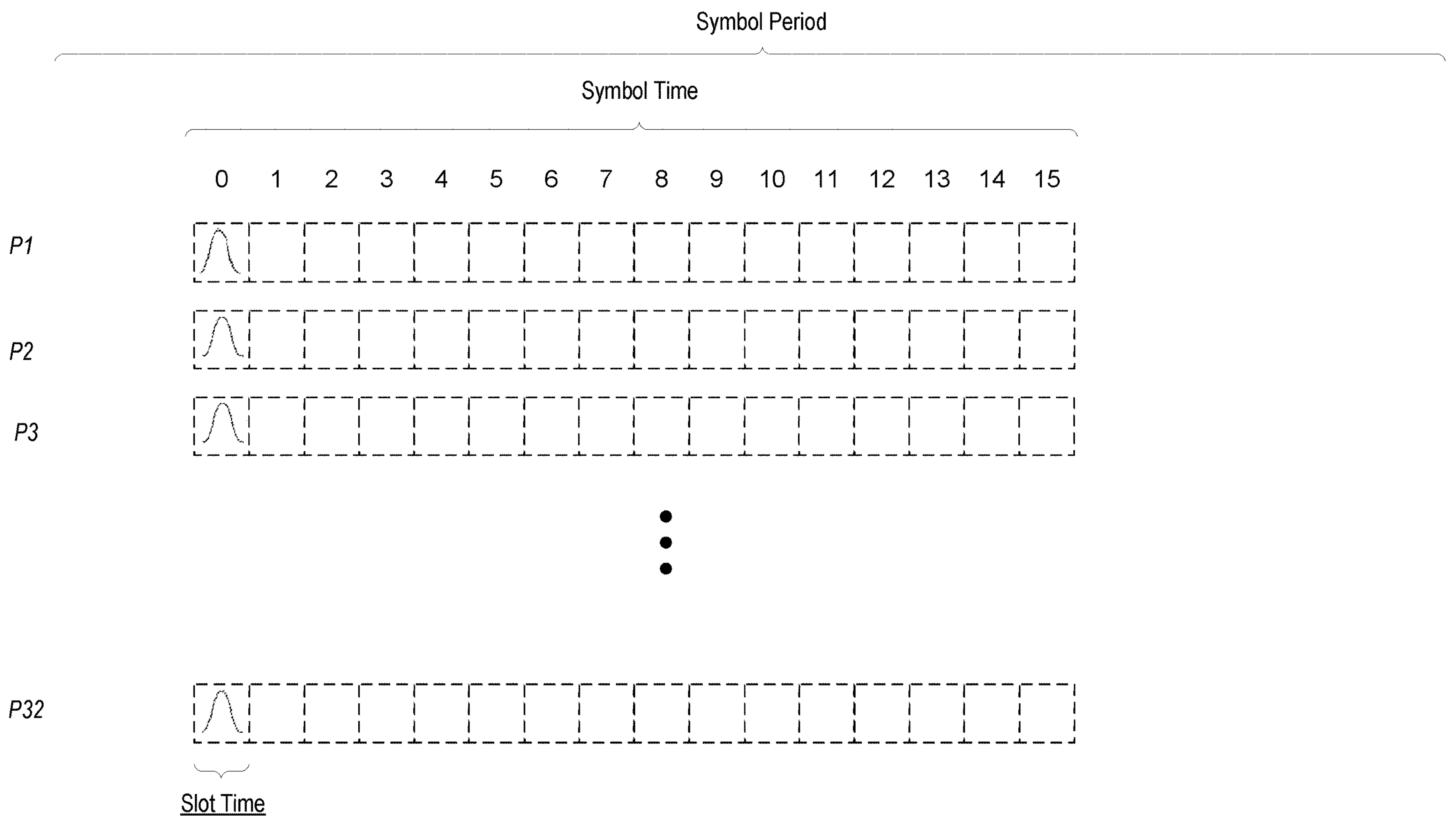
FIG. 3 illustrates a first series of symbols received by a receiver.

The first synchronization sequence 201 is encoded with pulses configured to allow the receiver 104 to identify slot boundaries and symbol boundaries. In particular, in some embodiments, a first series of symbols is repeatedly sent by the transmitter 102 in a known slot. In the most basic example, the same slot is used for all symbols in the first series of symbols. For example, as illustrated in FIG. 3 (which shows the pulses received by the receiver 104, but is also instructive for demonstrating how the transmitter 102 can encode and send pulses), the slot representing the symbol value 0 may be used for all 32 symbols. This results in 32 symbols that are all (or most all), within some threshold, equally spaced in time.

Other embodiments may use a different slot for all 32 symbols. Further note, that in some embodiments, the symbols in the first series of symbols may follow some other known pattern. For example, the first pulse P1 may have the pulse in the slot representing the symbol value of 1. The pulse P2 may have the pulse in the slot representing the symbol value of 2. The pulse P3 may have the pulse in the slot representing the symbol value of 3. And so forth. This would still result in at least 16 of the pulses being equally spaced, but spaced at a time of the symbol period plus one slot time.

Note that in some embodiments, the transmitter 102 may include a register having multiple cells per pulse. The register is used for adjusting pulses in slots to adjust timing of sending a pulse by adjusting which cells have 1s or 0s stored in them. For example, one embodiment may use a multigigabit I/O to move pulses around using a faster clock. Multiple 1's can be used to represent a slower speed 1. For example, 32 or 64 ones can be used for shifting pulses before sending. By knowing distance between pulses in different symbols, an appropriate shift can be determined. Thus, in some embodiments, such functionality may be implemented to implement a digital delay or digital acceleration. This may be particularly useful in some embodiments where known delays or accelerations are caused based on how pulses are transmitted with respect to each other.

Nonetheless, at the receiver 104 the first series of symbols are received as illustrated in FIG. 3. At this point, the receiver does not know slot boundaries or symbol boundaries, or even where the guard time occurs. However, by knowing the slot which the symbols in the first series of symbols are transmitted, and knowing the number of slot times in the symbol time, the receiver 104 can determine the slot and symbol boundaries. In particular, in the simple example illustrated in FIG. 3, after having received 32 instances of the same symbol value, the receiver 104 can accurately identify the location of the slot for the symbol value 0 using a statistical analysis. Using this information, the receiver can then determine slot times surrounding that slot, as well as the symbol time. By knowing the symbol period, the receiver 104 can then determine the guard time as illustrated in FIG. 4. That is, the guard time can be identified as the portion of the symbol period not including the symbol time. Note that the illustration in FIG. 4 is not indicative of a typical guard time. Indeed, as noted above, a guard time may be 80% of the symbol period and the symbol time will be 20% of the symbol period. Appropriate logical shifting can be performed at the receiver to position the symbol time as desired in a given symbol period. For example, the guard time can be positioned after the symbol time, before the symbol time, or in a known configuration around the symbol time.

Note further that the first synchronization stage, implemented by the first stage detector 212 and the first stage synchronization engine 214, may further be used to determine the amount of spreading that occurs in an environment where the transmitter 102 and receiver 104 will be operating. For example, some embodiments may be used in "moist" environments, such as with underwater vehicles, in environments where transmissions are sent through fog and/or clouds, through environments with certain atmospheric conditions, etc. that cause spreading due to dielectric properties of the medium in which the components operate. Further, pulses can be further degraded due to sudden changes in dielectric properties, such as when signals are transmitted through both water and open air, resulting in refraction at the air/water boundary. Thus, embodiments can estimate the amount of spreading in a transmission medium and thus estimate how wide of a pulse is expected to be received. In particular, by monitoring a number of equally spaced pulses, certain characteristics about the pulses can be observed.

Further, the first synchronization sequence can be used to determine PPM symbol timing. Additionally, it also conveys PPM frequency differences in transmitters' oscillators.

In some embodiments, to accomplish the first synchronization stage, a pulse matched filter in the first stage detector 212 may be used. In one particular embodiment, the filter has a time length delay of 200 ns, however, this delay is typically selected based on pulse rate. In one particular embodiment, the pulse matched filter outputs four samples per slot. In some embodiments, the first synchronization detector 212 stage may have a detection threshold that is four times the correlator standard deviation.

As noted previously, the first synchronization stage uses the first stage detector 212 to look for the equal-spaced pulses in the first synchronization sequence 201. One example implementation uses an autoregressive moving-average (ARMA) filter to update the correlation z for each ambiguity position.

$$z[n] = \frac{31}{32}z[n-1] + \frac{1}{32}x[n]$$

(assuming $N_1=32$, where $N_1$ is the first synchronization sequence 201)

In one example, by searching in a low order mode (16-PPM), the guard time comprises only 72 slots, giving 88 slot choices for slot 0. By oversampling the slot matched filter by 4 to reduce scalloping loss, there are only 352 ambiguity positions to search. Using the widest pulse matched filter for the sync sequence will be a poor match for narrower pulses, resulting in a reduced SNR. However, given that the narrower pulses (higher-order PPM) require a higher SNR for the LDPC decoder to provide good performance, this is not problematic in practice.

The equally-spaced pulses in the first synchronization sequence 201 provide energy for symbol synchronization, but they provide little information about frame synchronization. A high-SNR scenario will detect the symbol synchronization on the first or second pulse in the first synchronization sequence 201, while a low-SNR scenario will require nearly the full pulse train of 32 pulses—and will have a large uncertainty on which position provides the highest sequence correlation. Accordingly, the second pulse train (i.e., the second synchronization sequence 202) provides pulses in different positions with a minimal cross-correlation at off-time positions, as described in more detail below.

For each slot matched filter output received by the first stage synchronization engine 214, the first stage synchronization engine 214 must decide whether the current position is the position of slot 0. Assuming orthogonal modulation over an AWGN channel, the slot positions other than 0 will have only noise energy, while slot 0 will have signal and noise energy.

$$S_0 \sim N(0, N\sigma^2)$$

$$S_1 \sim N(N, N\sigma^2)$$

A maximum likelihood estimator will choose a threshold η such that the probabilities of false alarm and missed detect are equal.

$$P(\text{false alarm}) = P(\text{missed detect})$$

$$P(S_0 > \eta) = P(S_1 < \eta)$$

The last equation is satisfied for η=N/2.

$$P(S_0 > \eta) = Q\left(\frac{\frac{N}{2}}{\sqrt{N\sigma^2}}\right) = Q\left(\frac{\sqrt{N}}{2\sigma}\right)$$

For the first stage detector 212, it is desirable to have very few false alarms since the detector 212 will evaluate this criterion many times per frame. In implementation, a suitable false alarm probability can be set directly from the detector statistics. For example, setting the detection threshold to 4 times the correlator output standard deviation will give a false alarm probability around $3 \cdot 10^{-5}$, which will give on average several false alarms in a frame of up to $2 \cdot 10^6$ slots of this size. Since a false alarm can be dismissed quickly in the second stage, having around 10 false alarms per frame is not a problem.

Once the receiver 104 has identified the slot boundaries, symbol boundaries, and guard time, the receiver is now able to perform a second synchronization operation using the second synchronization sequence 202 in FIG. 2A. In particular, a known pattern of 32 pulses (i.e., the next 32 pulses, pulses 33-64) is sent from the transmitter 102 to the receiver 104. In particular, the second synchronization sequence 202 provides the receiver with pulses that are used for clock extractions and establishing of the PPM framing boundaries using autocorrelation techniques. For example, as illustrated in the abbreviated example illustrated in FIG. 4, the symbol sequence may be, for example: [13 14 9 11 4 5 10 6 6 11 15 11 3 3 1 9 7 8 4 7 2 12 3 5 15 4 7 11 10 1 8 6]. Note that this is merely an example, and any appropriate symbol sequence may be used. This sequence is illustrated by representation in pulses 33, 34, 35, and 64 representing pulse values 13, 14, 9, and 6 from the sequence above. The remaining pulses (i.e., pulses 36-63) are not shown for brevity inasmuch as the principles can be understood from the shown pulses.

Note that, in some embodiments, one constraint that is imposed on the symbols in the second synchronization sequence 202 is that they not include any symbol values included in the first synchronization sequence 201. Thus, in this example, if the 0 slot is used for the first synchronization sequence 201, no 0s will be used in the symbol sequence for the second synchronization sequence 202. This can be done primarily to prevent elements of the second synchronization sequence 202 as being interpreted as part of the first synchronization sequence 201 and vice versa. Additionally or alternatively, in some embodiments, 0s may be avoided in the second synchronization sequence 202 to prevent prematurely tripping the second synchronization sequence detection threshold in detector circuitry before the second synchronization sequence 202 has had a chance to be fully shifted in to the appropriate registers.

Further it may be desirable to select the second synchronization sequence 202 to minimize the off-time peak autocorrelation, symbol-aligned and symbol-unaligned. When noise is dominant, only the on-time peak will be distinguishable.

In some embodiments, a pulse matched filter is used for pulse detection in the second synchronization stage 218. In some embodiments, the second stage pulse matched filter is configured to oversample as high as reasonable for fine slot timing. In particular, embodiments may attempt to oversample each slot at a rate as high as sampling hardware will allow. Generally, embodiments attempt to set a threshold for the second synchronization stage large enough to make false alarms and misses unlikely. If a good balance cannot be achieved, a longer sync sequence is needed. For one particular embodiment, the second synchronization stage may implement a threshold of the larger of 4 times the correlator standard deviation and 4 times the largest single sample into the correlator. That is, for the illustrated example, using a threshold of 4 times the correlator output standard deviation will work well. When the signal is strong (i.e., having high SNR according to some threshold), embodiments will adjust the threshold according to the pulse energy coming into the correlator. For example, an additional threshold that is exceeded of 4 times the largest sample into the correlator is used. Since the autocorrelation will only give up to two pulses to an off-time alignment, this additional threshold should be sufficient to reject off-time correlations.

Some care will be required in the first stage logic to avoid overwhelming the second stage detector(s) 216. For example, in a high-SNR scenario, at 4 times oversampling, several of the oversampled matched filter outputs may be larger than the threshold. To avoid checking multiple samples for each pulse, some embodiments take the largest pulse in a small window of 8 samples (or some other predetermined number of samples), for example, around a correlator output that exceeds the first stage detector threshold. Similarly, some embodiments examine the second-stage detector outputs in an oversampled window around the time predicted by the first stage to find the maximum correlation for fine synchronization.

Still in a high-SNR scenario, each symbol-aligned output of the first stage synchronization engine 214 will likely exceed the threshold. In some embodiments, this can be addressed by instantiating at least $2N_1$ second stage engines. Alternatively or additionally, the interface between the first and second stage engines can be implemented so that a later first-stage correlation within a slot time of an earlier successful correlation can cancel the previous success. Some care will be required here since, with sufficient noise, it may be impossible to tell from the first correlator output which of the several correlation peaks around the ideal value is correct.

In an alternative embodiment, the second-stage correlator in the second stage synchronization engine 218 is designed so that it searches all 2N_1 ambiguities for the position of the second stage sequence when given a candidate slot 0 position (or other known position). In this case, ideally, multiple first-stage threshold detections in the same slot 0 position will be idempotent.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
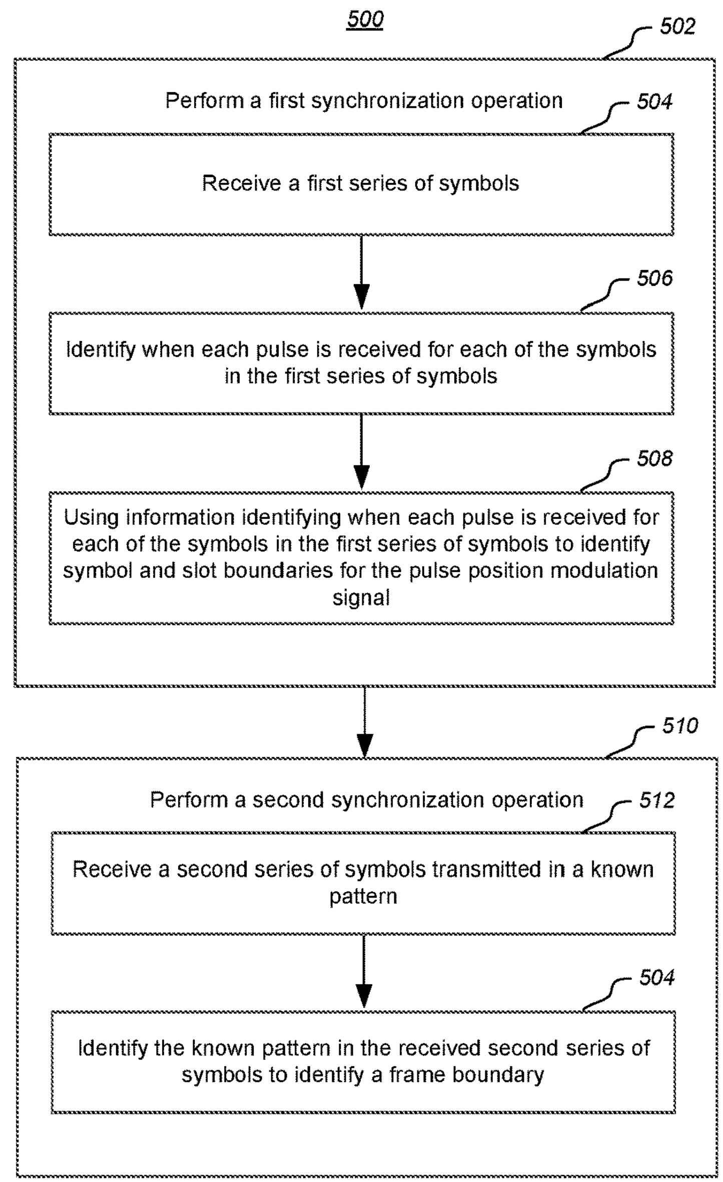
FIG. 5 illustrates a method of synchronizing a pulse position modulation signal.

Referring now to FIG. 5, a method 500 is illustrated. The method includes acts for synchronizing a pulse position modulation (PPM) signal comprising a plurality of PPM symbols. Each symbol comprises a plurality of time slots. For each symbol, a pulse in one of the time slots defines the symbol value. Each symbol is associated with a guard time used to ensure a minimum time between adjacent symbol pulses in adjacent symbols.

The method includes performing a first synchronization operation (502). The first synchronization operation includes receiving a first series of symbols (act 504). Each of the symbols in the first series of symbols is transmitted with a pulse in a known slot, such that the first series of symbols comprises pulses that are substantially equally spaced in time from adjacent symbols. The first synchronization operation further includes identifying when each pulse is received for each of the symbols in the first series of symbols (act 506). The first synchronization operation further includes, using information identifying when each pulse is received for each of the symbols in the first series of symbols to identify symbol and slot boundaries for the pulse position modulation signal (act 508).

The method 500 further includes performing a second synchronization operation (act 510). The second synchronization operation includes receiving a second series of symbols transmitted in a known pattern (act 512). The second synchronization operation further includes identifying the known pattern in the received second series of symbols to identify a frame boundary (act 514).

The method 500 may be practiced where receiving the first series of symbols and second series of symbols comprises receiving light pulses from a Q-pulsed laser.

The method 500 may be practiced where the first series of symbols and second series of symbols are received from a transmitter that intentionally prevents any symbols in the first series of symbols from being included in the second series of symbols.

The method 500 may be practiced where each of the first series of symbols is in a same slot in a different symbol time.

The method 500 may be practiced where each of the first series of symbols is in a different slot in a different symbol time, but transmitted so as to be equally spaced.

The method 500 may be practiced where identifying the known pattern in the received second series of symbols to identify a frame boundary is performed by performing an autocorrelation of the received second series of symbols.

The method 500 may be practiced where the symbols in the second series of symbols are encoded using Gray coding to minimize performance degradation when channel spreading exceeds a given slot.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of synchronizing a pulse position modulation (PPM) signal comprising a plurality of PPM symbols, each symbol comprising a plurality of time slots, where, for each symbol, a pulse in one of the time slots defines the symbol value, each symbol also being associated with a guard time used to ensure a minimum time between adjacent symbol pulses in adjacent symbols, the method comprising:

performing a first synchronization operation by:

receiving a first series of symbols, wherein each of the symbols in the first series of symbols is transmitted with a pulse in a known slot, such that the first series of symbols comprises pulses that are substantially equally spaced in time from adjacent symbols;

identifying when each pulse is received for each of the symbols in the first series of symbols; and using information identifying when each pulse is received for each of the symbols in the first series of symbols to identify symbol and slot boundaries for the pulse position modulation signal; and performing a second synchronization operation by receiving a second series of symbols transmitted in a known pattern, and identifying the known pattern in the received second series of symbols to identify a frame boundary.

2. The method of claim 1, wherein receiving the first series of symbols and second series of symbols comprises receiving light pulses from a Q-pulsed laser.

3. The method of claim 1, wherein the first series of symbols and second series of symbols are received from a transmitter that intentionally prevents any symbols in the first series of symbols from being included in the second series of symbols.

4. The method of claim 1, wherein each of the first series of symbols is in a same slot in a different symbol time.

5. The method of claim 1, wherein each of the first series of symbols is in a different slot in a different symbol time, but transmitted so as to be equally spaced.

6. The method of claim 1, wherein identifying the known pattern in the received second series of symbols to identify a frame boundary is performed by performing an autocorrelation of the received second series of symbols.

7. The method of claim 1, wherein the symbols in the second series of symbols are encoded using Gray coding to minimize performance degradation when channel spreading exceeds a given slot.

8. A receiver computer system configured to communicate using a pulse position modulation (PPM) signal comprising a plurality of PPM symbols, each symbol comprising a plurality of time slots, where, for each symbol, a pulse in one of the time slots defines the symbol value, each symbol also being associated with a guard time used to ensure a minimum time between adjacent symbol pulses in adjacent symbols, the receiver computer system comprising:

one or more processors; and one or more computer-readable media having stored thereon instructions that are executable by the one or more processors to configure the computer system to synchronize the pulse position modulation (PPM) signal, including instructions that are executable to configure the computer system to perform at least the following:

performing a first synchronization operation by:

receiving a first series of symbols, wherein each of the symbols in the first series of symbols is transmitted with a pulse in a known slot, such that the first series of symbols comprises pulses that are substantially equally spaced in time from adjacent symbols;

identifying when each pulse is received for each of the symbols in the first series of symbols; and using information identifying when each pulse is received for each of the symbols in the first series of symbols to identify symbol and slot boundaries for the pulse position modulation signal; and performing a second synchronization operation by receiving a second series of symbols transmitted in a known pattern, and identifying the known pattern in the received second series of symbols to identify a frame boundary.

9. The receiver computer system of claim 8, wherein the receiver computer system comprises a light sensor for receiving the first and second series of symbols as a light pulses from a Q-pulsed laser.

10. The receiver computer system of claim 8, wherein the first series of symbols and second series of symbols are received from a transmitter that intentionally prevents any symbols in the first series of symbols from being included in the second series of symbols.

11. The receiver computer system of claim 8, wherein each of the first series of symbols is in a same slot in a different symbol time.

12. The receiver computer system of claim 8, wherein each of the first series of symbols is in a different slot in a different symbol time, but transmitted so as to be equally spaced.

13. The receiver computer system of claim 8, wherein identifying the known pattern in the received second series of symbols to identify a frame boundary is performed by performing an autocorrelation of the received second series of symbols.

14. The receiver computer system of claim 8, wherein the symbols in the second series of symbols are encoded using Gray coding to minimize performance degradation when channel spreading exceeds a given slot.

15. A transmitter computer system configured to communicate using a pulse position modulation (PPM) signal comprising a plurality of PPM symbols, each symbol comprising a plurality of time slots, where, for each symbol, a pulse in one of the time slots defines the symbol value, each symbol also being associated with a guard time used to ensure a minimum time between adjacent symbol pulses in adjacent symbols, the receiver computer system comprising:

one or more processors; and one or more computer-readable media having stored thereon instructions that are executable by the one or more processors to configure the computer system to facilitate synchronization of the pulse position modulation (PPM) signal, including instructions that are executable to configure the computer system to perform at least the following:

transmitting a first series of symbols, wherein each of the symbols in the first series of symbols is transmitted with a pulse in a known slot, such that the first series of symbols comprises pulses that are substantially equally spaced in time from adjacent symbols, such that the first series of symbols can be used to identify slot boundaries and symbol boundaries; and transmitting a second series of symbols transmitted in a known pattern, such that the known pattern in the second series of symbols can be used to identify a frame boundary.

16. The transmitter computer system of claim 15, wherein the transmitter computer system comprises a Q-pulsed laser for transmitting the first and second series of symbols.

17. The transmitter computer system of claim 15, wherein the first series of symbols and second series of symbols are intentionally transmitted in a fashion that prevents any symbols in the first series of symbols from being included in the second series of symbols.

18. The transmitter computer system of claim 15, wherein transmitting the first series of symbols comprises transmitting each of the symbols in first series of symbols in a same slot in a different symbol time.

19. The transmitter computer system of claim 15, further wherein the one or more computer-readable media further have stored thereon instructions that are executable by the one or more processors to configure the computer system to encode the symbols in the second series of symbols using Gray coding to minimize performance degradation when channel spreading exceeds a given slot.

20. The transmitter computer system of claim 15, further comprising a register having multiple cells per pulse, the register configured for adjusting pulses in slots to adjust timing of sending a pulse by adjusting which cells have 1s or 0s stored in them.

* * * * *